(12) United States Patent
Depies et al.

(10) Patent No.: US 10,743,045 B2
(45) Date of Patent: Aug. 11, 2020

(54) SYSTEM METHOD FOR AUDIO-VIDEO PLAYBACK RECOMMENDATIONS

(71) Applicant: The DIRECTV Group, Inc., El Segundo, CA (US)

(72) Inventors: Michael Depies, Lawndale, CA (US); Aaron Goldstein, Marina Del Rey, CA (US); Carl J. Harvey, Venice, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 15/656,859

(22) Filed: Jul. 21, 2017

(65) Prior Publication Data

US 2019/0028748 A1 Jan. 24, 2019

(51) Int. Cl.
| | |
|---|---|
| *H04N 21/25* | (2011.01) |
| *H04N 21/258* | (2011.01) |
| *H04N 21/262* | (2011.01) |
| *H04N 21/2668* | (2011.01) |
| *H04N 21/2665* | (2011.01) |
| *H04L 29/08* | (2006.01) |
| *H04L 29/06* | (2006.01) |

(52) U.S. Cl.
CPC ....... *H04N 21/252* (2013.01); *H04L 65/4084* (2013.01); *H04L 67/20* (2013.01); *H04L 67/22* (2013.01); *H04L 67/306* (2013.01); *H04N 21/25891* (2013.01); *H04N 21/2665* (2013.01); *H04N 21/2668* (2013.01); *H04N 21/26258* (2013.01)

(58) Field of Classification Search
CPC ........... H04N 21/252; H04N 21/25891; H04N 21/26258; H04N 21/44222; H04N 21/4825; H04N 21/2665; H04N 21/4532; H04L 67/20; H04L 67/306; H04L 51/32; H04L 67/22; G06F 17/30772; G06F 17/30053; G06F 17/30828; G06F 17/30029; G06F 17/30038
USPC .......................................................... 725/16
See application file for complete search history.

(56) References Cited

U.S. PATENT DOCUMENTS

| | | | |
|---|---|---|---|
| 6,657,116 | B1 | 12/2003 | Gunnerson |
| 7,207,057 | B1 | 4/2007 | Rowe |
| 7,702,728 | B2 | 4/2010 | Zaner et al. |

(Continued)

FOREIGN PATENT DOCUMENTS

| | | |
|---|---|---|
| WO | WO 2007/065091 A1 | 6/2007 |
| WO | WO 2008/066759 A1 | 6/2008 |

(Continued)

OTHER PUBLICATIONS

"Jukup enhances musical experience at your events!"; Jukup; Jukup. com; May 2014; 3 pages.

(Continued)

*Primary Examiner* — Cynthia M Fogg
(74) *Attorney, Agent, or Firm* — BakerHostetler

(57) ABSTRACT

A method includes receiving a request for streaming content from a device of a user, accessing a user profile to determine a first preference of the user, accessing a user device to identify third party content service providers of the user to determine a second preference of the user, and generating a playlist based on the first preference and the second preference of the user.

9 Claims, 5 Drawing Sheets

(56) References Cited

U.S. PATENT DOCUMENTS

| | | | |
|---|---|---|---|
| 7,720,686 B2 | 5/2010 | Volk et al. | |
| 7,786,367 B2 | 8/2010 | Hansson et al. | |
| 7,818,350 B2 | 10/2010 | New et al. | |
| 8,176,101 B2 | 5/2012 | Rosenberg | |
| 9,154,535 B1* | 10/2015 | Harris | H04N 21/2402 |
| 9,191,303 B2 | 11/2015 | Fuste Vilella et al. | |
| 9,442,935 B2 | 9/2016 | Lehtiniemi et al. | |
| 9,444,565 B1 | 9/2016 | Leopardi et al. | |
| 2003/0227478 A1* | 12/2003 | Chatfield | G06Q 10/10 |
| | | | 715/751 |
| 2006/0161621 A1 | 7/2006 | Rosenberg | |
| 2006/0265349 A1* | 11/2006 | Hicken | G11B 27/105 |
| 2007/0156676 A1* | 7/2007 | Rosenberg | G06F 16/4387 |
| 2007/0162502 A1* | 7/2007 | Thomas | G06F 17/3082 |
| 2010/0049862 A1* | 2/2010 | Dixon | G06F 17/30035 |
| | | | 709/231 |
| 2010/0178030 A1* | 7/2010 | Colby | H04N 5/782 |
| | | | 386/291 |
| 2010/0228740 A1* | 9/2010 | Cannistraro | G06Q 30/00 |
| | | | 707/748 |
| 2010/0318671 A1* | 12/2010 | Lee | H04L 65/4084 |
| | | | 709/231 |
| 2011/0246566 A1* | 10/2011 | Kashef | G06F 16/437 |
| | | | 709/203 |
| 2011/0295843 A1* | 12/2011 | Ingrassia, Jr. | G06F 17/30053 |
| | | | 707/723 |
| 2012/0290653 A1* | 11/2012 | Sharkey | H04W 4/023 |
| | | | 709/204 |
| 2013/0198268 A1 | 8/2013 | Hyman | |
| 2013/0218942 A1 | 8/2013 | Willis et al. | |
| 2014/0067827 A1 | 3/2014 | Bilinski et al. | |
| 2014/0201634 A1 | 7/2014 | Hill et al. | |
| 2015/0081671 A1 | 3/2015 | Bankowski | |
| 2015/0271557 A1 | 9/2015 | Tabe | |
| 2015/0286714 A1 | 10/2015 | Talbott | |
| 2015/0356447 A1 | 12/2015 | Lowe et al. | |

FOREIGN PATENT DOCUMENTS

| | | |
|---|---|---|
| WO | WO 2009/120301 A3 | 10/2009 |
| WO | WO 2009/149063 A1 | 12/2009 |
| WO | WO 2013/062558 A1 | 5/2013 |
| WO | WO 2013/174018 A1 | 11/2013 |
| WO | WO 2015/187382 A1 | 12/2015 |
| WO | WO 2016/156554 A1 | 10/2016 |

OTHER PUBLICATIONS

"Home: Flo Music App"; Flomusic.com; Jul. 20105; 3 pages.

Beach et al.; "Fusing Mobile, Sensor, and Social Data to Fully Enable Context-Aware Computing"; Proceedings of the 11$^{th}$ Workshop on Mobile Computing Systems & Applications HOTMOBILE; 2010; 6 pages.

Rosi et al.; "Social Sensors and Pervasive Services: Approaches and Perspectives"; IEEE Int'l Conf. on Pervasive Computing and Communications; 2011; 6 pages.

Beach et al.; "CAwbWeb: Towards a Standardized Programming Framework to Enable a Context-Aware Web"; Technical Report CU-CS-1063-10; Mar. 2010; 9 pages.

* cited by examiner

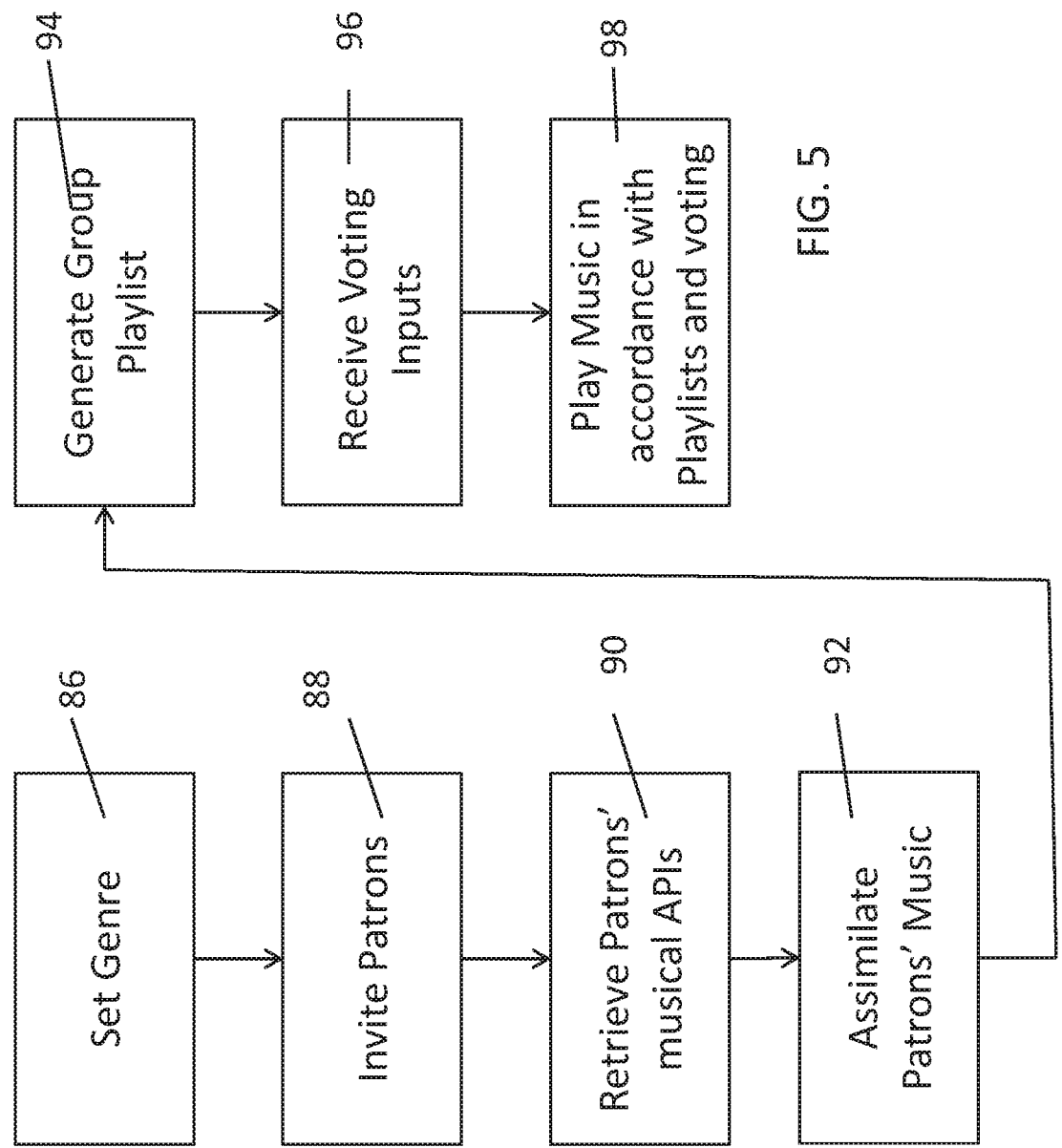

SYSTEM METHOD FOR AUDIO-VIDEO PLAYBACK RECOMMENDATIONS

TECHNICAL FIELD

Embodiments of the present inventions relate to methods and systems for recommending audio video content to customers, and more particularly, to methods and systems for recommending audio video playlists based on user preferences.

BACKGROUND

There have been past systems which provide recommendations for content. Such recommendation systems have been available, for example, for music services. Several music services curate the best or most relevant songs catered to a user's listening habits within that music service's ecosystem. Often the playlists are curated in advance and the user "selects" a playlist by identifying a particular artist, song or genre. However, such music recommendation systems are tailored to the individual user, but fail to consider the tastes of a group of individuals that may be listening and/or viewing music content together. In the case where the music recommendation is tailored to an individual user, the recommendation is typically limited to inputs received by that particular music ecosystem. As such, there is a need to create an audio video recommendation system that will show programming that caters to the tastes of a group of individuals.

SUMMARY

The present disclosure is directed to a system and method for an audio-video playback recommendation service. The method includes receiving a request for streaming content from a device of a user, accessing a user profile to determine a first preference of the user, accessing a user device to identify third party content service providers of the user to determine a second preference of the user, and generating a playlist based on the first preference and the second preference of the user. The method may also include generating a call to an application program interface of the third party content service providers and streaming content from the third party content service provider to the device of the user, either directly or retrieving content from the third party content service provider and then forwarded the content to the device of the user. In an aspect, the method may also include inviting an additional user to create a group playlist, receiving an acceptance of the additional user from a device of the additional user, receiving a third preference from the device of the additional user and wherein the playlist is generated based on the first preference, the second preference and the third preference. The method may further include distributing the playlist to the device of the user and the device of the additional user and streaming content to the device of the user and the device of the additional user. In an aspect, the method may further include receiving a third preference from the device of the additional user and weighting one of the first preference, the second preference and the third preference and the playlist is generated based on the weighting and streaming content to the device of the user and the device of the additional user.

The present disclosure is also directed to a server including an input/output system for communicatively coupling the server to an input device and a storage source, a processor communicatively coupled to the input/output system, and memory storing instructions that cause the processor to effectuate operations, the operations including rceiving a request for streaming content from a device of a user, accessing a user profile to determine a first preference of the user, accessing a user device to identify third party content service providers of the user to determine a second preference of the user and generating a playlist based on the first preference and the second preference of the user. The operations may further include generating a call to an application program interface of the third party content service providers and streaming content from the third party content service provider to the device of the user. In an aspect, the operations may include generating a call to an application program interface of the third party content service providers and receiving content from the third party content service provider and forwarding the content to the device of the user.

In an aspect, the operations may further include receiving a third preference from a device of an additional user and wherein the playlist is generated based on the first preference, the second preference and the third preference and may optionally include weighting one of the first preference, the second preference and the third preference and the playlist is generated based on the weighting.

In an aspect, the method includes receiving registrations from a plurality of user devices, retrieving preferences of individual users from the plurality of user devices, and generating a group playlist based on the retrieving step and may also include displaying content based on the group playlist. The playlist may have a plurality of content entries and the operations may further include receiving a vote of one or more individual users for one of the plurality of content entries and wherein the playlist is adjusted based the vote. In an aspect, a genre is selected and the preferences of individual users are based on the genre.

BRIEF DESCRIPTION OF THE DRAWINGS

The following detailed description of preferred embodiments is better understood when read in conjunction with the appended drawings. For the purposes of illustration, there is shown in the drawings exemplary embodiments; however, the subject matter is not limited to the specific elements and instrumentalities disclosed. In the drawings:

FIG. 5 is an exemplary process flow of yet another method of operation for the in accordance with the present disclosure.

DETAILED DESCRIPTION OF ILLUSTRATIVE EMBODIMENTS

Overview. The present disclosure includes systems and methods for a recommendation system that provides a user or group of users to view audio-video content. While the disclosure will be described in terms of music videos, it will be understood that the disclosure and appended claims may include content other than music videos, and my for example, include sports highlight videos, short films, commercials, audio-only music, gaming and other content. In an aspect, the system and method may be directed to an individual user based on that user's preferences, actions and habits across multiple platforms and user devices. In another aspect, the system and method may be directed to a shared user experience in which the preferences, actions and habits across multiple platforms for multiple users having connections with or to each other are considered in providing recommendations for common listening and/or viewing, wherein the group of users is either co-located or located remotely from each other. In another aspect, the system and method may be directed to a shared user experience in which the users are grouped together based on a common location and the recommendations are based on the preferences, actions and listening/viewing habits of multiple users at that location.

As described in more detail below, every user who may be a participant in the system and method of the present disclosure may have a set of music preferences. Such preferences may be based on song topics, performers, region, genre, or some other criteria. Moreover, each of such users may subscribe to multiple music ecosystems, including but not limited to, for example, Spotify®, Apple Music™, Vevo®, or the like. Within each music ecosystem, each user may have established preferences based on the curated music available within each music ecosystem either through selection, history, or some other method for establishing preferences. Moreover, each user's social media usage may indicate other music preferences, for example, a user may follow a performer on Instagram® or may have "Liked" that performer on Facebook®. Finally, each user may have curated one or more individual playlists for their own personal consumption.

Figure 1:
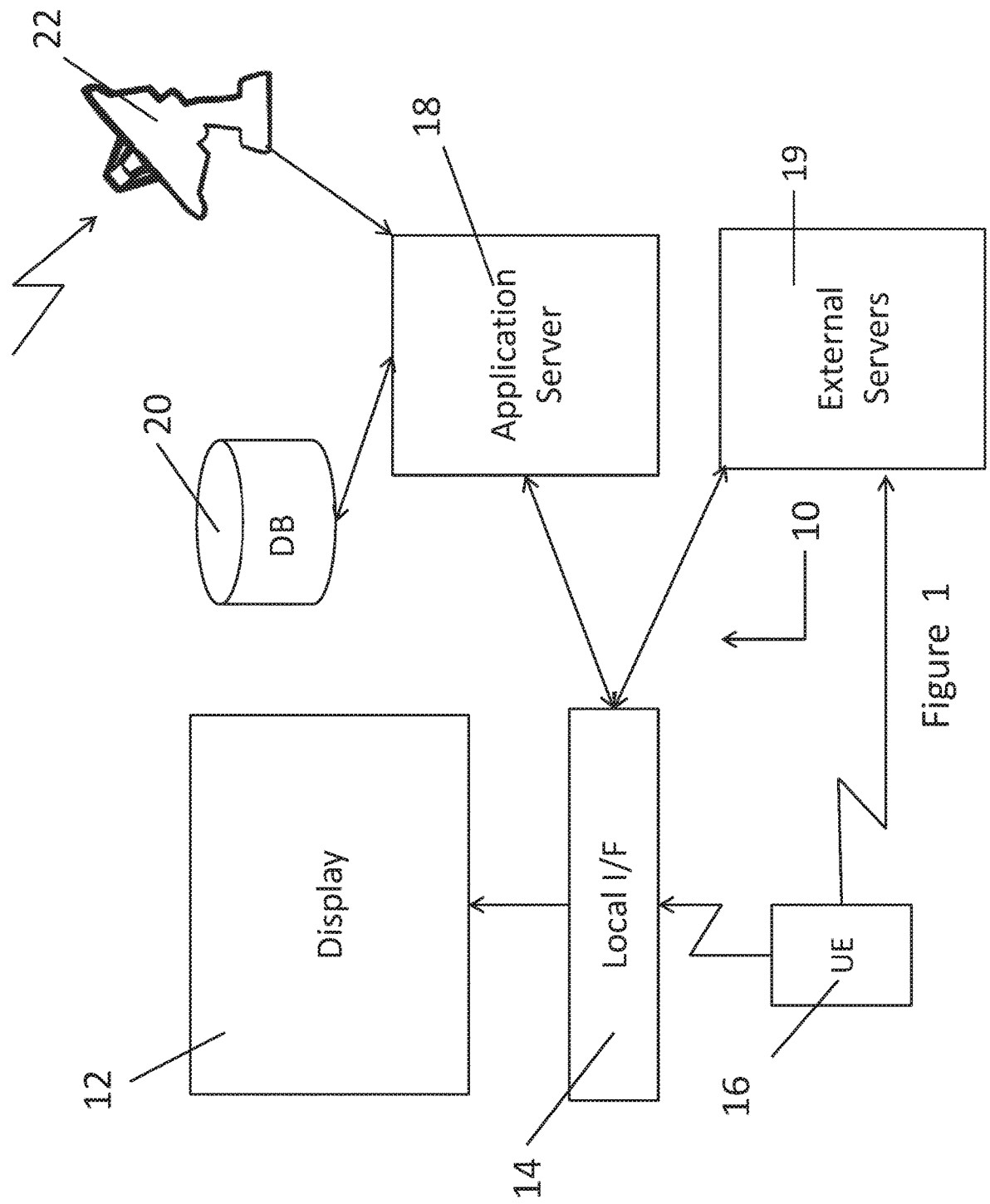
FIG. 1 is a schematic representation of an exemplary system environment in which the methods and systems of the present disclosure may be implemented.

System Environment. Illustrated in FIG. 1 is a schematic representation of an exemplary system 10 environment in which embodiments of the present disclosure may operate. In the exemplary system 10, there is shown a display 12 as a video output of an entertainment system, which may, for example, include audio-video outputs having music video content. While the display 12 is shown in an exemplary system, those skilled in the art will understand that the display 12 may be any type of video output, including but not limited to, video outputs associated with a tablet, smartphone, personal computer, LCD, or any other video output display. In a public venue, the display 12 may be a large format screen and may, for example, include multiple displays 12. The display screen 12 is in communication with a local interface 14 which may be controlled by user equipment ("UE") 16 and which local interface 14 may be in communication with application server 18. It will be understood that local interface 14 may contain a variety of functions controlled by and accessed by UE 16. Alternatively, the present disclosure does not require a local interface 14 in order for system 10 to be operational and the UE 16 may be in direct communication with both display 12 and application server 18.

The UE 16 may, for example, be a smartphone, tablet or personal computer configured with an operating system which may, for example, be one of Apple's iOS, Google's Android, Microsoft Windows Mobile, or any other smartphone operating system or computer operating system or versions thereof. The UE 16 may control user input functions, including, but not limited to, selection and control of content, movies, recordings, applications and other functions. The UE 16 may provide the ability for a user to input preference data, billing information, profile information, friends, likes and dislikes, or other inputs that enable or personalize the functions available to a user. The UE 16 may include local client software for communication external servers 19 which may, for example, include client software for social media access.

The UE 16 may have a communication interface for a wireless or wired communication system, which may, for example, be WiFi, Bluetooth®, 3G, 46 LTE, and 5G, WiFi, LAN, WiLan or any other wireless communication system. The UE 16 may be in communication with an application server 18 through any of the above-identified systems or through the local interface 14. The functionality embedded and described in the disclosure may reside either on the UE 16, the local interface 14 or the application server 18 or a combination thereof. Such designation of functionality between the UE 16, the local interface 14 and server 18 may be a design choice or based on user experience, performance, cost, or any other factor. The allocation of functionality is exemplary only and non-limiting in scope of the present disclosure.

The UE 16 may be able to communicate across a communications interface with a variety of external servers 19 and/or other applications. Such external servers 19 may include social media applications, which may, for example, include Facebook®, Intsagram®, Snapchat®, Twitter® and any other known or to be developed social media application. It will be understood by those skilled in the art that such social media external servers 19 may supply data to the UE 16 as well as receive data from the UE 16. Other services may also reside on external servers 19, including music streaming services, and which may also be accessible from the UE 16.

Figure 2:
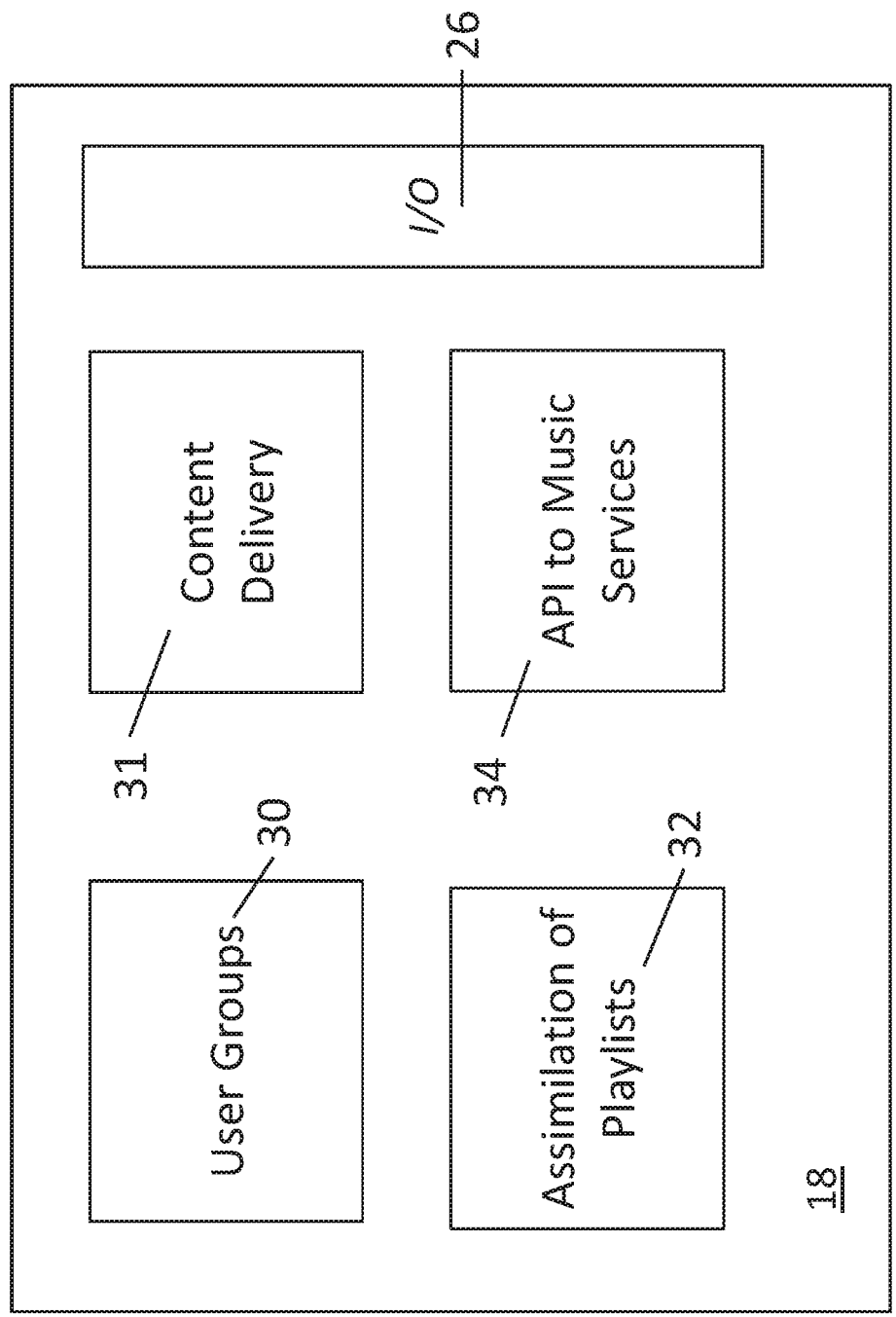
FIG. 2 is a functional block diagram of an exemplary server of the system of FIG. 1.

Illustrated in FIG. 2, there is shown an exemplary functional block diagram of a server 18. The server 18 may include an input/output port 26 for communication with other devices including the local interface 14. The server 18 may also include a user group function 30 The server 18 may also include content delivery 31. Assimilation of playlists 32 and APIs to music services 34 may also be included and stored in server 18. It will be understood that the configuration of server 18 is exemplary only and any or all of the functions may be distributed among multiple servers or computer networks.

Figure 3:
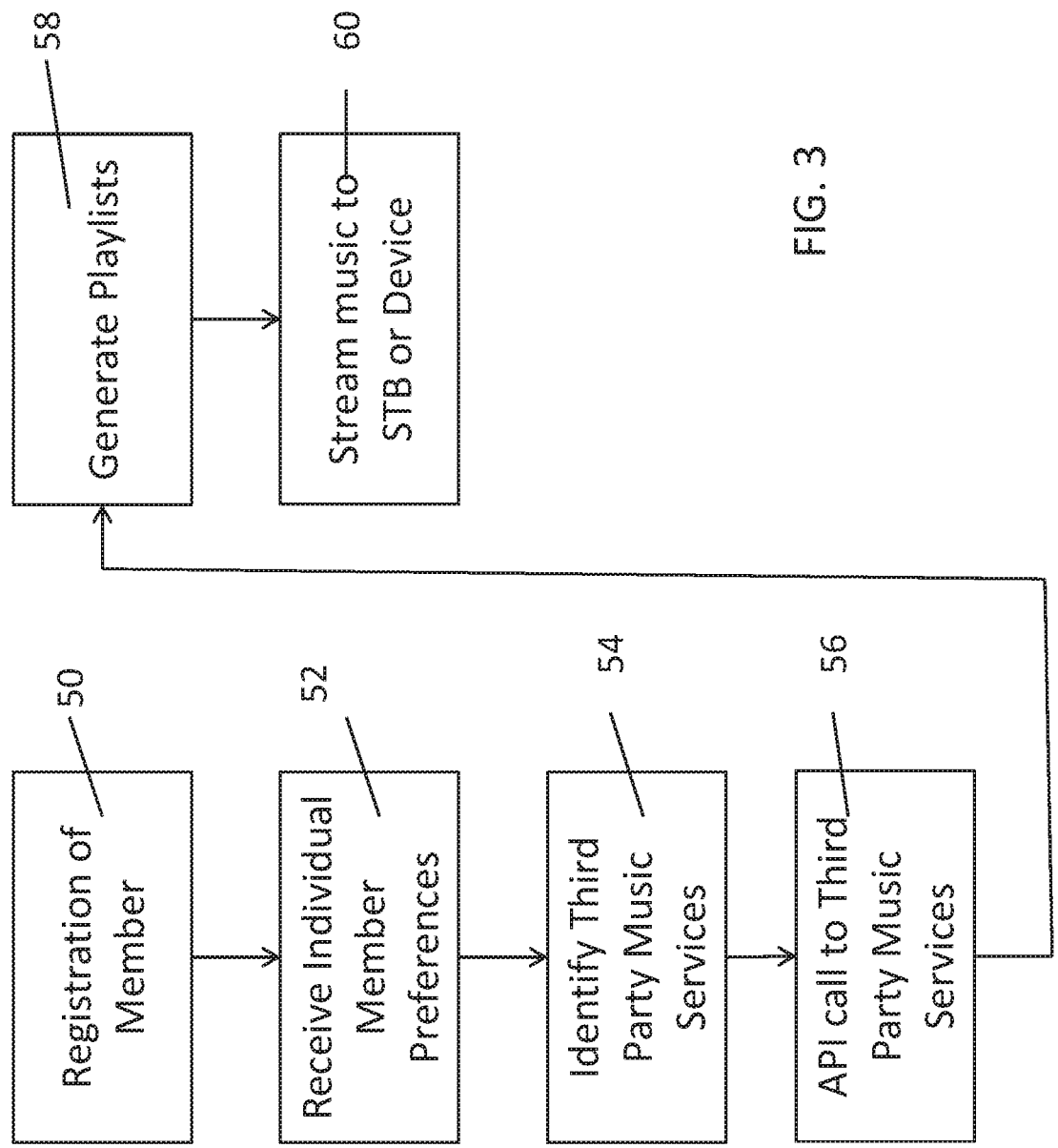
FIG. 3 is an exemplary process flow of a method of operation in accordance with the present disclosure.

Use Cases: The Individual User Experience. In an aspect, a user may subscribe to a music service in accordance with the present disclosure. With reference to FIG. 3, there is shown a flow chart highlighting an exemplary use case in which an individual may subscribe to a service and have playlists generated in accordance with many factors across multiple subscription services. At 50, a user (member) registers with the system 10, either initially or through a sign-on procedure. At 52, the individual user's preferences are retrieved. These preferences may be retrieved based on a personal profile, a history of previous playlists, self-generated playlists, and other music subscriptions or followings on Twitter®, Facebook® and Instagram®. At 54, the system 10 would identify the preferences the user may have with other third party music streaming providers such as Spotify®. At 56, the system may interface through application programming interfaces (APIs) to the identified third party music providers. At 58, based on the retrieved information, the system 10 may generate playlists for the user and at 60, stream the music to the local interface 14 or the user device 16. The local interface 14 may be a set-top box such that the musical content may be displayed on display 12, which content may, for example, be an audio-video musical program such as a music video.

Figure 4:
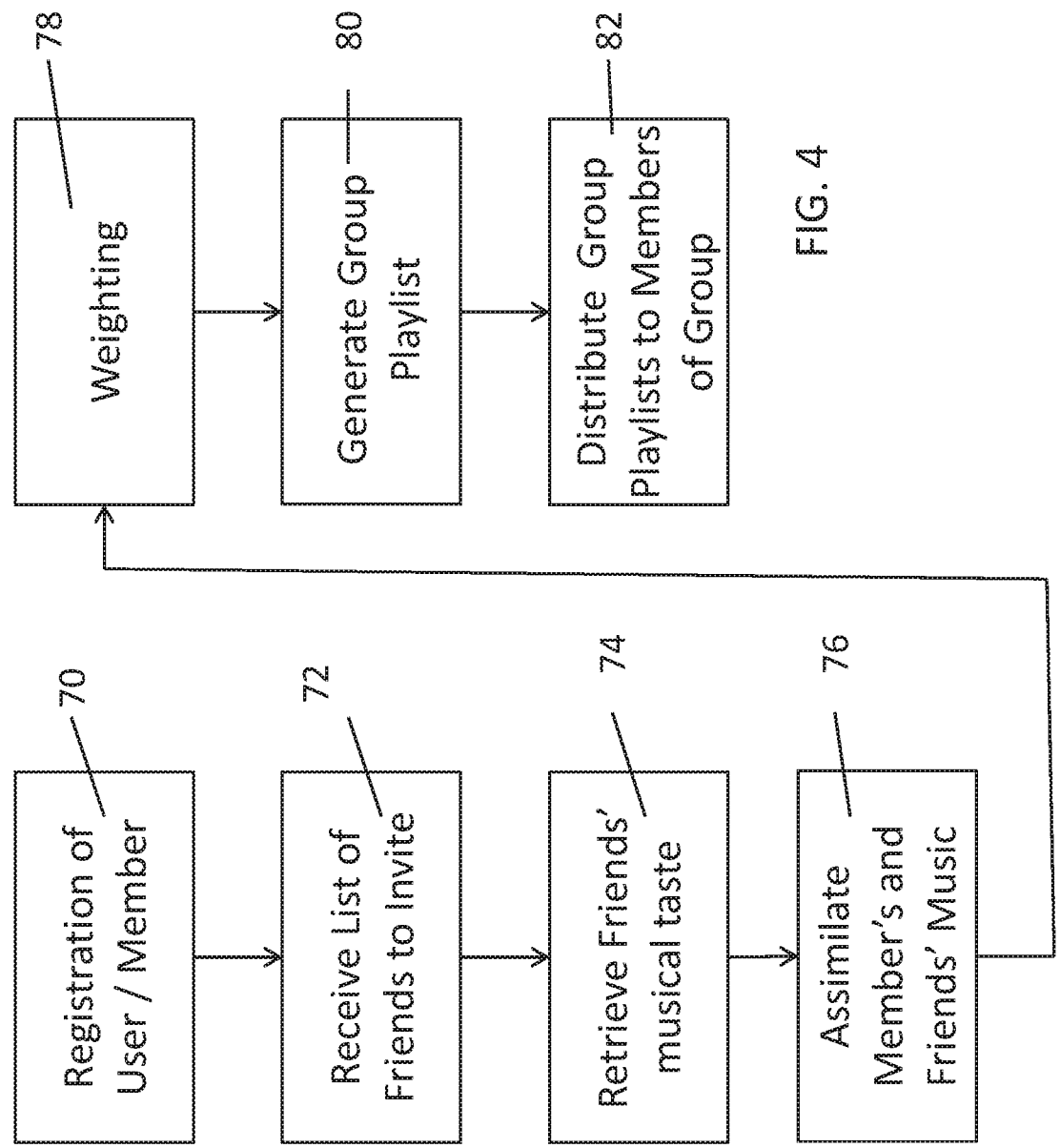
FIG. 4 is an exemplary process flow of another method of operation in accordance with the present disclosure.

The Shared Experience. In an aspect, a user may subscribe to a music service in accordance with the present disclosure such that the user's friends and acquaintances may share in programming recommendations based on the collective preferences of the user and the user's friends and acquaintances. With reference to FIG. 4, there is shown a flow chart highlighting an exemplary use case in which an individual may subscribe to a service and designate and/or invite friends to participate in the shared experience. At 70, a user (member) registers with the system 10, either initially or through a sign-on procedure. At 72, the user either designates of invites friends to participate to form a group. This process may, for example, include a user identifying friends from his Facebook® or other social media accounts or from the user's contact list. The user may also enter contact information directly from the user device 16. At 74, the designated friends' musical taste is queried and retrieved. This query may be, for example, by analyzing entries and followings posted on social media, music subscription services of the friends, and other information that may be available through on-line profiles, listening history or any other manner. At 76, the musical interests of the friends and the users are assimilated. Those interests may be optionally weighted at 78, such weighting being supplied by the user, predetermined based on the profiles of the user and/or the friends. For example, the user's preferences may be given more weight since the user assembled the group of friends at the outset. In an aspect, there may be a category of users/friends that would be known as "influencers" whose musical preferences may be given more weight than others. Such influencers may be in the music industry as performers, producers or managers, or be designated as such based on their personality or experiences. Weighting may be determined based on the relative numbers of followers/following in the social media context. Alternatively, such weighting is optional and there may be no weighting attached to the assimilated preferences. Regardless of whether there is weighting, at 80, the system generates a group playlist and at 82 the group playlist is distributed to the user and the user's friends that now make up the group. Each of the user or friends may then play selections from the playlist individually on their own user devices 16 or displays 12 or the selections may be played on a the application server 18 or an external server 19 and accessed by the members of the group simultaneously. Similar to the earlier use case, the local interface 14 may be a set-top box such that the musical content may be displayed on display 12 of either the user or the invited friends, which content may, for example, be an audio-video musical program such as a music video.

In an aspect, the invited friends may also designate friends to join the group. In that manner, not only will the user be able to aggregate a group of friends, but those friends of the user that have their own network of friends would also be able to do so as well.

The Shared Experience—Establishment. In an aspect, a proprietor of an establishment may use the system 10 for entertainment in that establishment which may, for example, be a bar, restaurant, nightclub or other venue. With reference to FIG. 5, there is shown an exemplary flow chart showing a method in accordance with the present disclosure. At 86, the genre of music is selected. At 88, an invitation to patrons is set. The invitation may be in the form of a text or social media message or an invitation to opt-in to the system by registering your device. The invitation may take the form of a push notification. At 90, for those patrons that have opted-in, APIs associated with the patrons' respective music services are retrieved. The music APIs may track the current festive mood of the establishment and pull music recommendations accordingly. At 92, the patrons' collective music preferences are assimilated. At 94, group patron playlists are generated. At 96, an opportunity to vote may be granted to the patrons. With respect to such voting, patrons may vote to move a particular recommendation up or down on the playlist, with the playlist being accessed from the top down. In this manner, popular content will tend to move towards the top of the playlist as patrons engage in such voting. Down votes will have the effect of moving the content down the playlist or have it removed completely. At 98, the content is played based on the assimilated playlists and the subsequent voting. The content may be played on a display and/or sound system within the establishment or may be streamed to one or more devices associated with the patrons or a combination thereof. In that manner, a patron leaving the establishment may still enjoy the content.

In an aspect, the proprietor will have access to its own subscription service and play the selected audio and/or audio-video content in the establishment from its own subscription service based on the selected playlists. In an alternative aspect, the system may select to play the content by accessing one of the patrons music services on the client device.

It will be understood that there may be variations to the system 10. For example, a patron may be able to use his or her device for requesting a particular song. In other words, if the establishment is a college venue in West Virginia, the selected genre is country music and the assimilated playlists include only the current national top 40 country hits, a patron may request that a song from the Recipe, a band from nearby Mannington, West Virginia, be added. This results in an added dimension to the participation of patrons and may serve to introduce the patrons to new musical acts.

In an aspect, after content is played from the assimilated playlists, patrons may vote their approval/disapproval/rankings for input into the next assimilated playlists.

With this disclosure, a user may be able to have the user's personal music collection go public with the power to influence the playlist in a group setting. The system 10 may be automatic such that the only inputs may be a list of users, friends or patrons and the system may do the rest in terms of recommendations and curating a group playlist There may be other added benefits to the system 10. Any television may be adapted to stream high-definition music videos and rich audio tracts. An individual can create custom, crowd-pleasing playlists with little effort. A proprietor of an establishment can track its customers that check-in and offer other perks such as coupons or special invitations.

Although not every conceivable combination of components and methodologies for the purposes describing the present disclosure have been set out above, the examples provided will be sufficient to enable one of ordinary skill in the art to recognize the many combinations and permutations possible in respect of the present disclosure. Accordingly, this disclosure is intended to embrace all such alterations, modifications and variations that fall within the spirit and scope of the appended claims. In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

While example embodiments have been described in connection with various computing devices/processors, the underlying concepts can be applied to any computing device, processor, or system capable of performing the processing as described herein. The methods and apparatuses of the present disclosure, or certain aspects or portions thereof, can take the form of program code (i.e., instructions) embodied in tangible storage media having a physical structure, such as floppy diskettes, CD-ROMs, hard drives, or any other machine-readable storage medium having a physical tangible structure (computer-readable storage medium), wherein, when the program code is loaded into and executed by a machine, such as a computer, the machine becomes an apparatus for distributing connectivity and/or transmission time. A computer-readable storage medium, as described herein is an article of manufacture, and thus, is not to be construed as a transitory signal. In the case of program code execution on programmable computers, which may, for example, include server 40, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and systems of the present disclosure may be practiced via communications embodied in the form of program code that is transmitted over some transmission medium, such as over electrical wiring or cabling, through fiber optics, wherein, when the program code is received and loaded into and executed by a machine, such as an EPROM, a gate array, a programmable logic device (PLD), a client computer, a controller, or the like, the machine becomes an apparatus for use in reconfiguration of systems constructed in accordance with the present disclosure. When implemented on a general-purpose processor, the program code combines with the processor to provide a unique apparatus that operates to invoke the functionality described herein.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

Any service marks or trademarks ("Marks") incorporated or referenced herein are included as illustrative examples only and such Marks are presumed to be owned by their respective owners and no claim is made to any such Marks by virtue of being referenced herein. The disclosure and appended claims are not intended to be limited by the use of such Marks as illustrative examples.

What is claimed:

1. A method comprising:

receiving, by a server, a request for streaming content from a device of a user;

accessing, by the server, a user profile to determine a first preference of the user;

accessing, by the server, a user device associated with the user to identify a third party content service provider of the user;

retrieving, by the server, user content preferences from the third party content service provider to determine a second preference of the user;

determining, by the server, additional user content preferences from social media associated with the user;

inviting, by the server, an additional user having an additional user device to create a group playlist;

wherein the group play list has a plurality of content entries and further comprising receiving, by the server a first vote from the user for at least one of the plurality of content entries and a second vote from the additional user for at least one of the plurality of content entries and wherein the play list is adjusted based on the first vote and the second vote wherein the first vote and second vote are weighted relative to each other by the server to derive the adjusted play list; and wherein the weighting is based on whether the user or the other user is an influencer.

2. The method of claim 1 further comprising receiving, by the server, an acceptance of the additional user from the additional user device of the additional user.

3. The method of claim 2 further comprising distributing, by the server, the playlist to the user device and the additional user device of the additional user.

4. The method of claim 3 further comprising streaming, by the server, content from the playlist to the user device and the additional user device of the additional user.

5. The method of claim 1 further comprising receiving, by the server, a third preference from the additional user device of the additional user and weighting one of the first preference, the second preference, the additional user content preferences, and the third preference and a playlist is generated based on the weighting.

6. The method of claim 1 wherein the first vote comprises a first ranking of two or more of the plurality of the content entries and the second vote comprises a second ranking of two or more of the plurality of content entries and wherein the group playlist is adjusted based on the first ranking and the second ranking to create an overall ranking.

7. The method of claim 6 further comprising streaming the plurality of content entries based on the overall ranking to the device and the additional device.

8. A method comprising:

receiving, by a server, a request for streaming content from a device of a user;

accessing, by the server, a user profile to determine a first preference of the user;

accessing, by the server, a user device associated with the user to identify a third party content service provider of the user;

retrieving, by the server, user content preferences from the third party content service provider to determine a second preference of the user;

determining, by the server, additional user content preferences from social media associated with the user;

inviting, by the server, an additional user having an additional user device to create a group playlist;

wherein the group play list has a plurality of content entries and further comprising receiving, by the server a first vote from the user for at least one of the plurality of content entries and a second vote from the additional user for at least one of the plurality of content entries and wherein the play list is adjusted based on the first vote and the second vote wherein the first vote and second vote are weighted relative to each other by the server to derive the adjusted play list; and wherein the weighting favors the user.

9. A method comprising:

receiving, by a server, a request for streaming content from a device of a user;

accessing, by the server, a user profile to determine a first preference of the user;

accessing, by the server, a user device associated with the user to identify a third party content service provider of the user;

retrieving, by the server, user content preferences from the third party content service provider to determine a second preference of the user;

determining, by the server, additional user content preferences from social media associated with the user;

inviting, by the server, an additional user having an additional user device to create a group playlist;

wherein the group play list has a plurality of content entries and further comprising receiving, by the server a first vote from the user for at least one of the plurality of content entries and a second vote from the additional user for at least one of the plurality of content entries and wherein the play list is adjusted based on the first vote and the second vote wherein the first vote and second vote are weighted relative to each other by the server to derive the adjusted play list; and wherein the weighting is determined based on a relative number of social media followers between the user and the other user.

* * * * *